United States Patent
Cheah et al.

(10) Patent No.: US 11,234,098 B1
(45) Date of Patent: Jan. 25, 2022

(54) METHOD AND APPARATUS FOR SETTING GEOFENCE

(71) Applicant: MOTOROLA SOLUTIONS, INC., Chicago, IL (US)

(72) Inventors: Huey Nee Cheah, Bayan Lepas (MY); Clement Pakiam Tobias Xavier, Batu Ferringhi (MY); Chung Yong Chong, Bayan Lepas (MY); Chong Keat Chuang, Ayer Itam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 50 days.

(21) Appl. No.: 16/917,958

(22) Filed: Jul. 1, 2020

(51) Int. Cl.
*H04W 4/00* (2018.01)
*H04W 4/021* (2018.01)
*H04W 4/14* (2009.01)
*G06K 9/00* (2006.01)

(52) U.S. Cl.
CPC ........ *H04W 4/022* (2013.01); *G06K 9/00288* (2013.01); *G06K 9/00744* (2013.01); *H04W 4/14* (2013.01)

(58) Field of Classification Search
CPC .... H04W 4/022; H04W 4/14; G06K 9/00288; G06K 9/00744
See application file for complete search history.

(56) References Cited

U.S. PATENT DOCUMENTS

| | | | |
|---|---|---|---|
| 7,541,926 B2 | 6/2009 | Dugan et al. | |
| 8,009,863 B1 | 8/2011 | Sharma et al. | |
| 8,044,782 B2 | 10/2011 | Saban | |
| 9,978,283 B2 | 5/2018 | Jedrzejewski et al. | |
| 10,249,165 B1 | 4/2019 | Doetzel | |
| 10,421,437 B1 | 9/2019 | Koskan | |
| 10,423,289 B2 | 9/2019 | Kimball et al. | |
| 2014/0155094 A1 | 6/2014 | Zises | |
| 2014/0256357 A1 | 9/2014 | Wang et al. | |
| 2015/0163629 A1 | 6/2015 | Cheung | |
| 2019/0158979 A1* | 5/2019 | Jurzak | H04W 4/022 |
| 2020/0089939 A1* | 3/2020 | Rodriguez Bravo | G06K 9/00335 |

* cited by examiner

*Primary Examiner* — Khai M Nguyen

(57) ABSTRACT

A method and apparatus for creating a geofence are provided herein. Unique geofences are created on a per-person basis, and based on a prediction of how likely a person is to wander. In one embodiment, the geofence for each individual is centered on a supervisor. For each individual being monitored, the geofence has an area that is inversely proportional to how likely a person is to wander. In this way, individuals that are more likely to wander will have a geofence that covers a smaller area than those who are not as likely to wander.

12 Claims, 2 Drawing Sheets

METHOD AND APPARATUS FOR SETTING GEOFENCE

BACKGROUND OF THE INVENTION

Supervisory personnel often encounter situations where they have to monitor many individuals simultaneously to make sure individuals do not wander. In order to address the above, a geofence may be created that defines a particular area. A supervisor may be notified if individuals wander outside the geofence. A problem exists in that typically every individual monitored will have the same, geofence that do not change. This places the same monitoring criteria on all individuals, independent of their tendency to wander.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
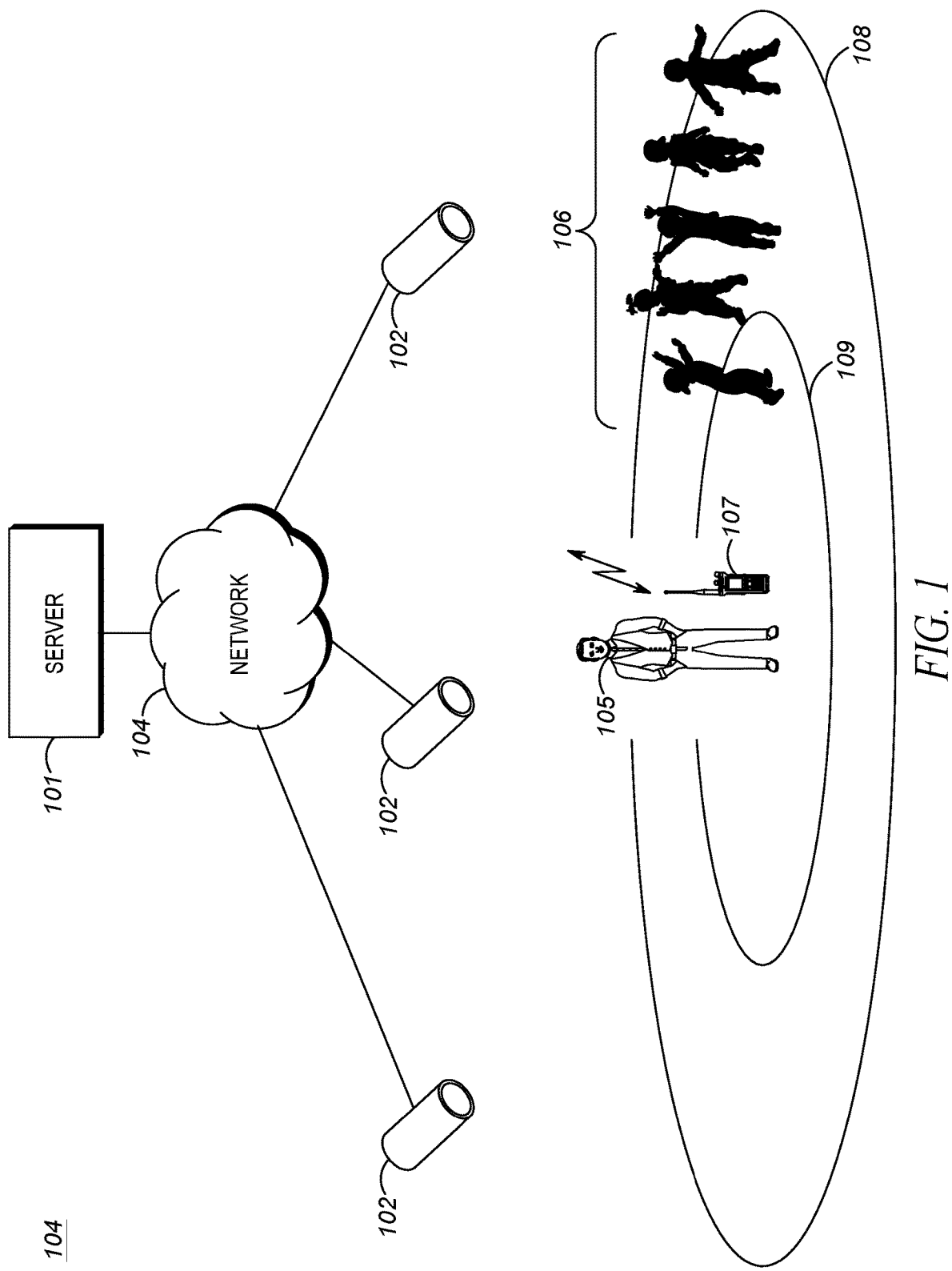
FIG. 1 is a block diagram of a general operating environment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned problem, a method and apparatus for creating a geofence are provided herein. Unique geofences are created on a per-person basis, and based on a prediction of how likely a person is to wander. In one embodiment, the geofence for each individual is centered on a supervisor. For each individual being monitored, the geofence has an area that is inversely proportional to how likely a person is to wander. In this way, individuals that are more likely to wander will have a geofence that covers a smaller area than those who are not as likely to wander.

In one embodiment of the present invention, an activity level is used as a prediction as to how likely a person is to wander. The activity level preferably comprises a metric as to how much distance a person has moved within a predetermined period of time. With this in mind, consider a teacher guiding students through a museum. Each student will have a unique geofence that surrounds the teacher. The unique geofence will have an area inversely proportional to the student's activity level. So, for students who are very active, the area of the geofence will be smaller than students who are less active.

As discussed, a student's activity level may be determined by monitoring the student and determining how much distance the student has covered in a predetermined amount of time. For example, those students that have moved the most distance in the predetermined time period will have a geofence covering a smaller area than students that have moved the least distance. Since in many situations, the students are expected to follow their supervisor, in order to more accurately calculate the student's activity level, the distance traveled by the supervisor may be subtracted from the distance traveled by the students when determining how active a student is.

In order to accomplish the above, a geofence server will determine a geofence that is tailored specifically to each individual, the area of the geofence being based on an activity level of the individual. Preferably, the geofence is centered on the supervisor. It should be noted that when a student crosses a geofence, the supervisor will receive an alert on a smart device providing the student's name and location.

In one embodiment of the present invention, the area of the geofence comprises a circle with a particular radius. The supervisor is located at the center of the circle. The area of the circle, and hence, the area of the geofence changes as the activity level of the individual changes. This can be accomplished by increasing or decreasing the radius of the circle as the activity level decreases or increases.

FIG. 1 illustrates a general operating environment 110 of the present invention. As shown, environment 110 (in this case a museum complex, but in alternate embodiments, any geographical area may utilize the present invention) is equipped with multiple cameras 102 positioned to capture individuals as they roam through the premises.

Each camera 102 has a spatial area that the camera can view, referred to as a view shed. The view shed is based on the geographical location of the camera, mounting height, and pan-tilt-zoom capabilities of the camera while also accounting for physical obstructions of the field of view. In a preferred embodiment of the present inventions, a union of all view sheds for cameras 102 will at least include the whole of the public spaces of the museum complex.

Geofence server 101 is provided. Server 101 is configured to determine a geofence for each individual 106 associated with supervisor 105. More particularly, server 101 is configured to determine an activity level for each individual and a geofence for each individual based on the activity level for the individual. Preferably, the geofence is centered upon supervisor 105.

For ease of explanation, only two geofence 108 and 109 are shown in FIG. 1. As shown, first geofence 108 encloses a first area and second geofence 109 encloses a second area, with the first area being greater than the second area. Each geofence is preferably centered upon supervisor 105 (but doesn't have to be). A first individual 106 will be assigned to first geofence 108, while a second individual 106 will be assigned to second geofence 109. Supervisor 105 will be notified when the individuals cross their associated geofence, but not other individual's geofence boundaries. Thus, supervisor 105 will be notified when the first individual crosses first geofence 108, but not when the first individual crosses second geofence 109.

Cameras 102 are attached (i.e., connected) to server 101 through network 104 via network interface. Example networks include any combination of wired and wireless networks, such as Ethernet, T1, Fiber, USB, IEEE 802.11, 3GPP LTE, and the like. During operation, server 101 receives feeds from multiple cameras 102, and then calculates an activity level for each individual along with their geofence. As is evident, the geofence is centered upon supervisor 105, and will move along with supervisor 105, preferably remaining centered upon supervisor 105 as they move.

Geofence server 101 may be a separate device or may lie internal other network equipment. Server 101 is configured to maintain a database of geofences associated with each individual 106. Geofence server 101 may maintain mappings that identify, for each individual 106, a geofence, and will notify supervisor 105 when the individual leaves the area defined by their respective geofence. The geofence server 101 may further provide mechanisms and/or interfaces for modifying geofences based on an activity level of a person.

Geofence definitions maintained by server 101 may include a point and radius, where the radius is a distance criterion and the point is a GPS coordinate of supervisor 105 (which may be in motion), such as a latitude and longitude pair, or some other form of cartographic definition. Further, geofence definitions may include of a set of two diagonally opposing rectangular vertices, where each rectangular vertex is a GPS coordinate (which may be in motion), such as a latitude and longitude pair, or some other form of cartographic definition. Other possibilities exist as well.

Figure 2:
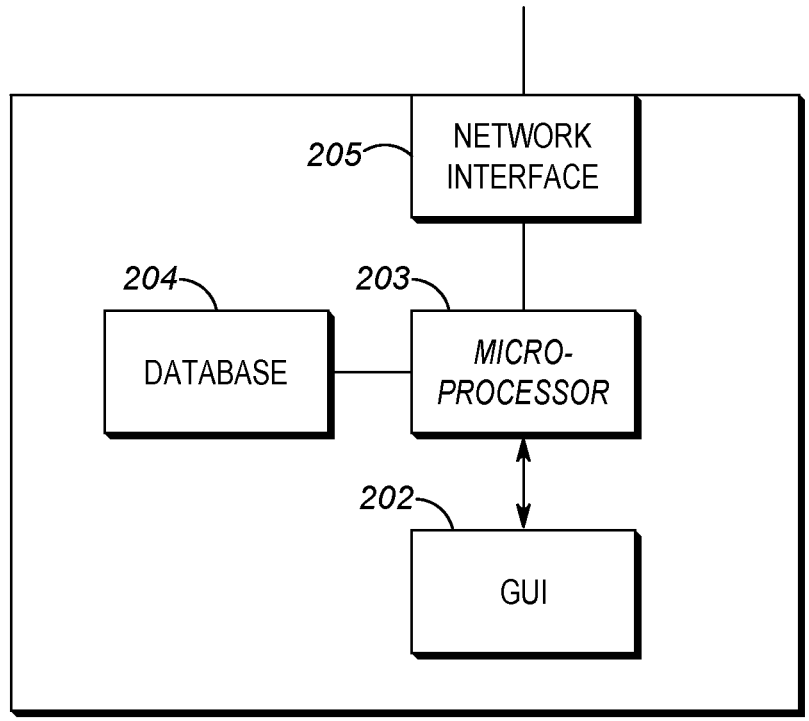
FIG. 2 is a block diagram of a geofence server.

FIG. 2 is a block diagram of sever 101 of FIG. 1. As shown, server 101 comprises logic circuitry 203, database 204, graphical-user interface (GUI) 202, and network interface 205. FIG. 2 shows those components (not all necessary) for server 101 to determine a geofence as described herein. In other implementations, server 101 may include more, fewer, or different components. Regardless, all components are connected via common data busses as known in the art.

Database 204 may function to store definitions that define a geofence, facial recognition data, and an activity level data for individuals. For example, database 204 may store a first geofence definition defining a first geofence associated with a first person, and at least a second geofence definition defining a second geofence associated with a second person. With this in mind, database 204 comprises standard memory (such as RAM, ROM, . . . , etc.) and serves to store names of individuals, whether or not the individual is a supervisor or subordinate (e.g., a student), along with biometric information for each individual that can be used to visually identify the individuals. For example, facial recognition metrics may be stored for all individuals, or alternatively, an image of each individual may be stored in database 204. Regardless of the information stored in database 204, database 204 comprises information/data used to visually identify individuals along with the names of the individuals. For example, if Joe Smith is a student, database 204 will at least have a name "Joe Smith" stored, along with biometric information needed to visually identify "Joe Smith".

The names of all individuals along with their biometric identification information may be input to database 204 as tickets are purchased for the venue. Alternatively, GUI 202 may be utilized to manually input the names of all individuals into database 204.

As mentioned above, database 204 comprises biometric information and/or images used to visually identify each individual. The biometric information/image may be populated within database 204 by capturing visual information (e.g. facial image(s), 3D facial mesh, driver's license photo, passport photo) of individuals at the time of ticket purchase or check-in. This may be done in a variety of ways. For example, in advance of the visit, the ticket purchaser may use their own smartphone or computer camera, in conjunction with a ticketing app or website, to capture images of themselves and their companions. Alternatively, a ticket sales agent (e.g. at a counter of a check-in terminal like at a museum) may capture images of individuals using a computer-connected camera or other type of camera. An individual may also use a ticket kiosk that is equipped with a camera (or within the view shed of a fixed security camera) at a terminal to provide biometric information. In addition to capture at the time of ticket purchase or check-in, an individual may capture biometrics as part of the process of signing up for a membership program or as part of enrollment in a pre-check service or personal identity management platform. Further, additional biometric data may be periodically collected each time an individual visits environment 110, walks through an area under video surveillance, or provides their biometric information as a logical or physical access control factor. Beyond biometric data capture, a smartphone token may be provided to an individual, e.g. via a transport provider's app, and/or RFID tags intended for attachment to bags or clothing may be supplied to individuals. Tokens and radio frequency identification tags could be used as additional identity factors and to increase the reliability of individual tracking as they move through the environment.

GUI 202 provides a man/machine interface for displaying information. For example, GUI 202 may provide a way of inputting facial-recognition data for an individual, and whether that individual is a supervisor or subordinate (e.g., a student). GUI 202 may comprise any combination of a touch screen, a video camera, or any other means for supplying database 204 with data.

Network interface 205 includes elements including processing, modulating, and transceiver elements that are operable in accordance with any one or more standard or proprietary wireless interfaces, wherein some of the functionality of the processing, modulating, and transceiver elements may be performed by means of the processing device 203 through programmed logic such as software applications or firmware stored on database 204 or through hardware. Examples of network interfaces (wired or wireless) include Ethernet, T1, USB interfaces, IEEE 802.11b, IEEE 802.11g, etc. Network interface 205 serves as means for logic circuitry 203 to obtain image/video data from cameras 102.

Finally, logic circuitry 203 comprises a digital signal processor (DSP), general purpose microprocessor, a programmable logic device, or application specific integrated circuit (ASIC) and is configured to determine a geofence for an individual. More particularly, logic circuitry 203 determines an activity level for the individual. Logic circuitry 203 then maps the activity level to a geofence area.

The mapping process preferably comprises an operation that associates each element of a given set (the domain) with one or more elements of a second set (the range). The current activity level for an individual comprise the domain, while the geofence area comprise the range. The mapping may be explicit based on predefined rules, or the mapping may be trained via machine learning. The mapping produces a geofence area for the individual. More specifically, if a current activity level (y) for an individual comprises the domain, it is said that f "takes the value" or "maps to" f(y). The set of possible outcomes of f(y) is called the range, and comprises a geofence area. The area preferably defines a distance from the supervisor that the individual is allowed to roam. Thus:

Current geofence area=Function(a current activity level for an individual).

The server of FIG. 2 comprises logic circuitry 203 configured to determine a current geofence for an individual based on the individual's current activity level. More particularly, given an area, a radius may be calculated, and a circular geofence, surrounding the supervisor, may be created. The circular geofence having a particular area that is based on an activity level.

More particularly, server 101 is an apparatus comprising a network interface configured to receive a video feed of a plurality of individuals. Logic circuitry is provided, and configured to analyze the video feed to determine an activity level for each of the plurality of individuals. Logic circuitry is also configured to determine a geofence for each of the plurality of individuals, wherein the geofence for an individual encompasses an area inversely proportional to the activity level.

As discussed, the activity level for an individual may comprise a distance traveled in a predetermined time period. Also, the geofence for each of the plurality of individuals may be centered on a same person.

As discussed, the logic circuitry is also configured to send an alert to the same person if any individual strays outside their geofence area.

In addition, the logic circuitry determines the geofence for each of the plurality of individuals by determining a first geofence encompassing a first area for a first individual, and determining a second geofence encompassing a second area for a second individual.

The logic circuitry may determine the geofence for each of the plurality of individuals by determining a first geofence encompassing a first area for a first individual, and determining a second geofence encompassing a second area for a second individual, and centering the first and the second geofence on a same individual.

In order to identify each individual, the logic circuitry may be configured to perform facial recognition on each of the plurality of individuals.

As mentioned, facial recognition may not be used to identify each individual. Other techniques, such as radio-frequency identification (RFID) badges being worn by each individual may be utilized. In another embodiment, location tracking devices may be worn by each individual, which report a location to the server.

With the above in mind, server 101 may comprise logic circuitry configured to determine an activity level for each of a plurality of individuals and determine a geofence for each of the plurality of individuals, wherein the geofence for an individual encompasses an area inversely proportional to the activity level. A network interface is provided and configured to output an alarm signal when an individual from the plurality of individuals crosses the geofence for the individual.

Determining an Activity Level for an Individual

The activity level for a person may be dynamic, changing periodically (e.g., every minute). In order to determine the current activity level for a person, microprocessor 203 receives camera feeds from cameras 102 and identifies each individual within the cameras view shed. An amount the individual moves (e.g., in meters) for a period of time is determined. In one embodiment, the activity level for the individual comprises a metric on how much distance a person covered within a given period of time. For example, a first person may move 50 meters in a minute, while another person may move only 10 meters in a minute.

Determining a Geofence for an Individual

An area of the geofence for an individual is a function of their activity level, which in an embodiment of the present invention comprises a distance a person has moved in a predetermined period of time (e.g., meters per minute). Specific geofence may be set for individuals based on how much distance they cover in a predetermined period of time. For example, students who wander<20 meters in a minute might have a first geofence area, while students who wander between 20 and 40 meters in a minute might have a second geofence area, and students who wander over 40 meters a minute may have a third geofence area. As discussed the first area>the second area>the third area. These areas may be circular, and may be centered upon a supervisor. As discussed, in order to more accurately determine a student's activity level, the distance the supervisor travels in the time period may be subtracted from each student's distance.

In another embodiment, students may be rank ordered in how much distance they cover in a predetermined period of time. The students ranked the lowest will have a first geofence area, while the students ranked the highest will have a second geofence area. As discussed, the first area is larger than the second area. Additionally, the area may be centered on the supervisor.

Figure 3:
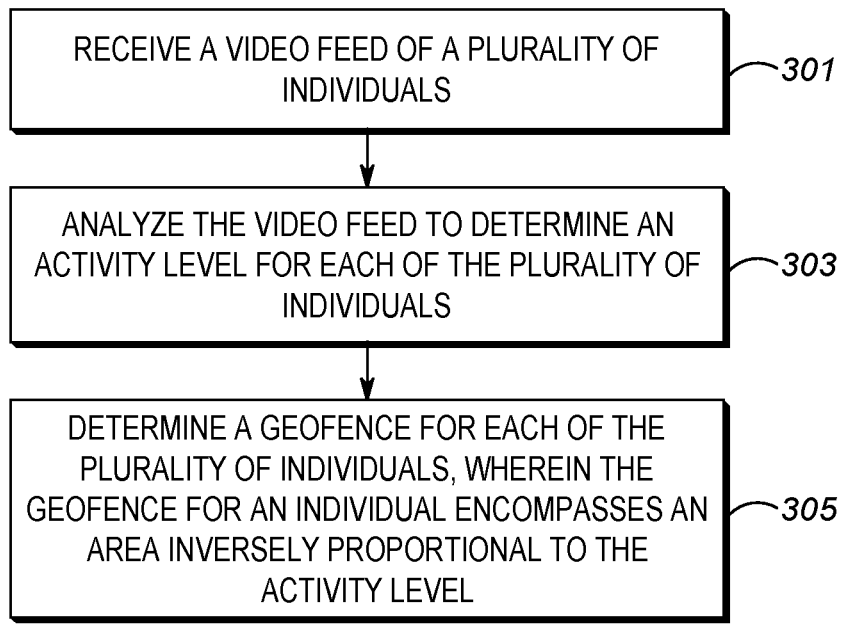
FIG. 3 is a flow chart showing operation of the geofence server of FIG. 2.

FIG. 3 is a flow chart showing those steps (not all necessary) for server 101 to create a geofence as described above. The logic flow begins at step 301 where network interface 205 receives a video feed of a plurality of individuals. At step 303 logic circuitry 203 analyzes the video feed to determine an activity level for each of the plurality of individuals. At step 305, logic circuitry 203 determines a geofence for each of the plurality of individuals, wherein the geofence for an individual encompasses an area inversely proportional to the activity level.

As discussed, the activity level for an individual may comprise a distance traveled in a predetermined time period, while the geofence for each of the plurality of individuals is centered on a particular person.

Additionally, logic circuitry 203 may send an alert (via network interface 205) to the particular person if any individual strays outside their geofence area. More particularly, the alert may comprise a text message to device 107 held by the particular person, or any other form of message that may be sent to a device held by the particular person.

As discussed, the step of determining the geofence for each of the plurality of individuals may comprise the step of determining a first geofence encompassing a first area for a first individual, and determining a second geofence encompassing a second area for a second individual. When this is the case, the step of determining the geofence for each of the plurality of individuals may comprise the step of determining a first geofence encompassing a first area for a first individual, and determining a second geofence encompassing a second area for a second individual, and centering the first and the second geofence on a same individual.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a network interface configured to receive a video feed of a plurality of individuals;
   logic circuitry configured to;
      analyze the video feed to determine an activity level for each of the plurality of individuals; and
      determine a geofence for each of the plurality of individuals, wherein the geofence for an individual encompasses an area inversely proportional to the activity level;
   wherein the logic circuitry determines the geofence for each of the plurality of individuals by determining a first geofence encompassing a first area for a first individual, and determining a second geofence encompassing a second area for a second individual, and centering the first and the second geofence on a same individual.

2. The apparatus of claim 1 wherein the activity level for an individual comprises a distance traveled in a predetermined time period.

3. The apparatus of claim 1 wherein the geofence for each of the plurality of individuals is centered on a same person.

4. The apparatus of claim 3 wherein the logic circuitry is configured to send an alert to the same person if any individual strays outside their geofence area.

5. The apparatus of claim 1 wherein the logic circuitry determines the geofence for each of the plurality of individuals by determining a first geofence encompassing a first area for a first individual, and determining a second geofence encompassing a second area for a second individual.

6. The apparatus of claim 1 wherein the logic circuitry is also configured to:
perform facial recognition on each of the plurality of individuals.

7. A method comprising the steps of:
receiving a video feed of a plurality of individuals;
analyzing the video feed to determine an activity level for each of the plurality of individuals; and
determining a geofence for each of the plurality of individuals, wherein the geofence for an individual encompasses an area inversely proportional to the activity level;
wherein the step of determining the geofence for each of the plurality of individuals comprises the step of determining a first geofence encompassing a first area for a first individual, and determining a second geofence encompassing a second area fora second individual, and centering the first and the second geofence on a same individual.

8. The method of claim 7 wherein the activity level for an individual comprises a distance traveled in a predetermined time period.

9. The method of claim 7 wherein the geofence for each of the plurality of individuals is centered on a same person.

10. The method of claim 9 further comprising the step of sending an alert to the same person if any individual strays outside their geofence area.

11. The method of claim 7 wherein the step of determining the geofence for each of the plurality of individuals comprises the step of determining a first geofence encompassing a first area for a first individual, and determining a second geofence encompassing a second area for a second individual.

12. The method of claim 7 further comprising the step performing facial recognition on each of the plurality of individuals.

* * * * *